US007620824B2

(12) United States Patent  (10) Patent No.: US 7,620,824 B2
Iino  (45) Date of Patent: Nov. 17, 2009

(54) DATA COMMUNICATING APPARATUS, DATA COMMUNICATING METHOD, AND PROGRAM

(75) Inventor: Yoichiro Iino, Tokyo (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 11/061,622

(22) Filed: Feb. 22, 2005

(65) Prior Publication Data

US 2005/0187966 A1    Aug. 25, 2005

(30) Foreign Application Priority Data

Feb. 23, 2004    (JP) .............................. 2004-046017

(51) Int. Cl.
*H04L 9/00*    (2006.01)
*H04L 9/32*    (2006.01)
(52) U.S. Cl. ........................ 713/194; 713/189; 713/150
(58) Field of Classification Search ................. 713/194, 713/150, 189
See application file for complete search history.

(56) References Cited

OTHER PUBLICATIONS

Privilege Separation, Wikipedia, printed out in 2008.*
Principle of Least Privileges, Wikipedia, printed out in 2008.*
History of massively multiplayer online games, Wikipedia, printed out in 2008.*
Massively multiplayer online games, Wikipedia, printed out in 2008.*
Combining Static and Dynamic Analysis for Automatic Identification of Precise Access-Control Policies Centonze, P.; Flynn, R.J.; Pistoia, M.; Computer Security Applications Conference, 2007. ACSAC 2007. Twenty-Third Annual Dec. 10-14, 2007 pp. 292-303.*
Access revocation and prevention of false repudiation in secure email exchanges Bai, L.; Achuthanandam, R.; Kam, M.; Autonomous Decentralized Systems, 2001. Proceedings. 5th International Symposium on Mar. 26-28, 2001 pp. 419-425.*
Using a Bayesian averaging model for estimating the reliability of decisions in multimodal biometrics Maple, C.; Schetinin, V.; Availability, Reliability and Security, 2006. ARES 2006. The First International Conference on Apr. 20-22, 2006 p. 7 pp.*

* cited by examiner

*Primary Examiner*—David Y Jung
(74) *Attorney, Agent, or Firm*—Oblon, Spivak, McClelland, Maier & Neustadt, L.L.P.

(57) ABSTRACT

A data communicating method is disclosed for use with a user terminal, the method preventing both members of a given group including the terminal and nonmembers from intercepting, tampering with or falsifying data communicated between the members without recourse to a plurality of encryption keys. In a first step, validity verification data is generated by the terminal. In a second step, the validity verification data and an attestation identity public key certificate are sent from the terminal to a group management device. In a third step, the group management device determines whether the terminal is valid. If the terminal is found valid, then a group name, a member ID and a group-shared key are supplied to the terminal in a fourth step, and a member ID list is further supplied in a fifth step. Thereafter the terminal is allowed to communicate with other members of the same group. The disclosed method can be applied advantageously to video game machines for network-based games.

9 Claims, 12 Drawing Sheets

| ID/KEY TABLE | | | ~51 |
|---|---|---|---|
| GROUP NAMES | MEMBER IDS | GROUP-SHARED KEYS | |
| X | $ID_X$ | $K_X$ | |
| Y | $ID_Y$ | $K_Y$ | |
| ⋮ | ⋮ | ⋮ | |

DATA COMMUNICATING APPARATUS, DATA COMMUNICATING METHOD, AND PROGRAM

BACKGROUND OF THE INVENTION

The present invention relates to a data communicating apparatus, a data communicating method, and a program. More particularly, the invention relates to a data communicating apparatus, a data communicating method, and a program used advantageously to exchange data between members belonging to the same group over a public network such as the Internet.

Members constituting a group may communicate data within the group over a public network such as the Internet. In such cases, there is a possibility that the data could be intercepted, tampered with or falsified by nonmembers.

Figure 1:
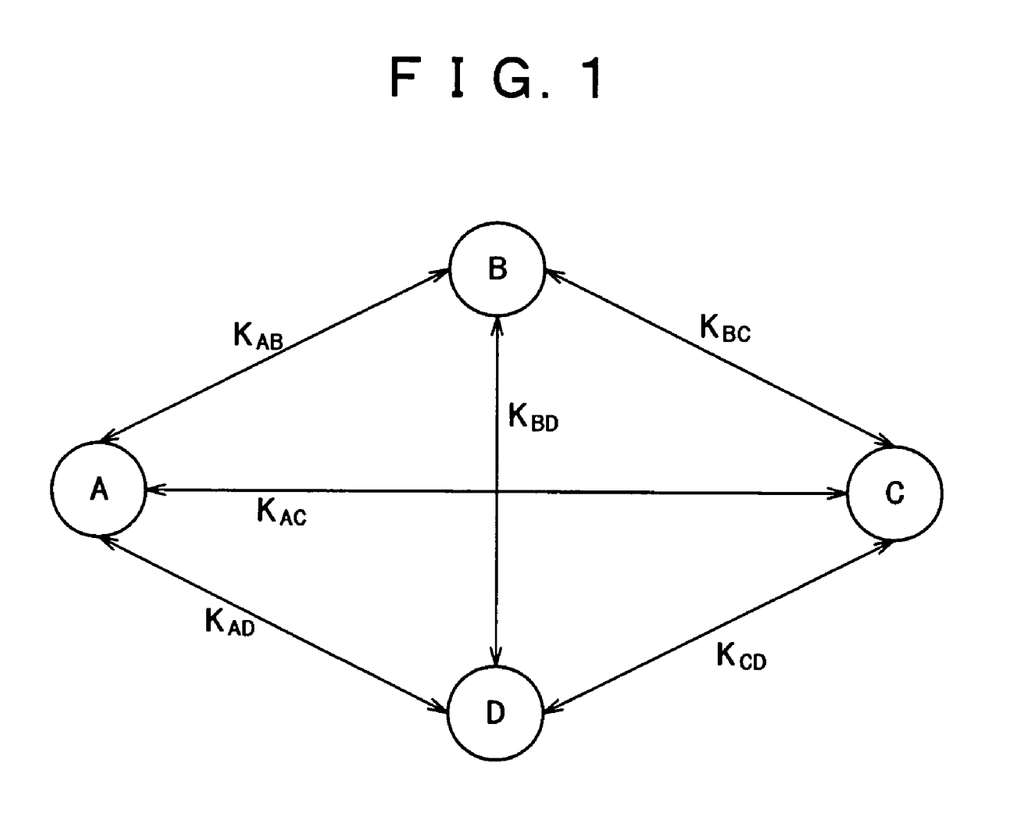
FIG. 1 is an explanatory view depicting a conventional encrypted communication setup using SSL.
Figure 4:
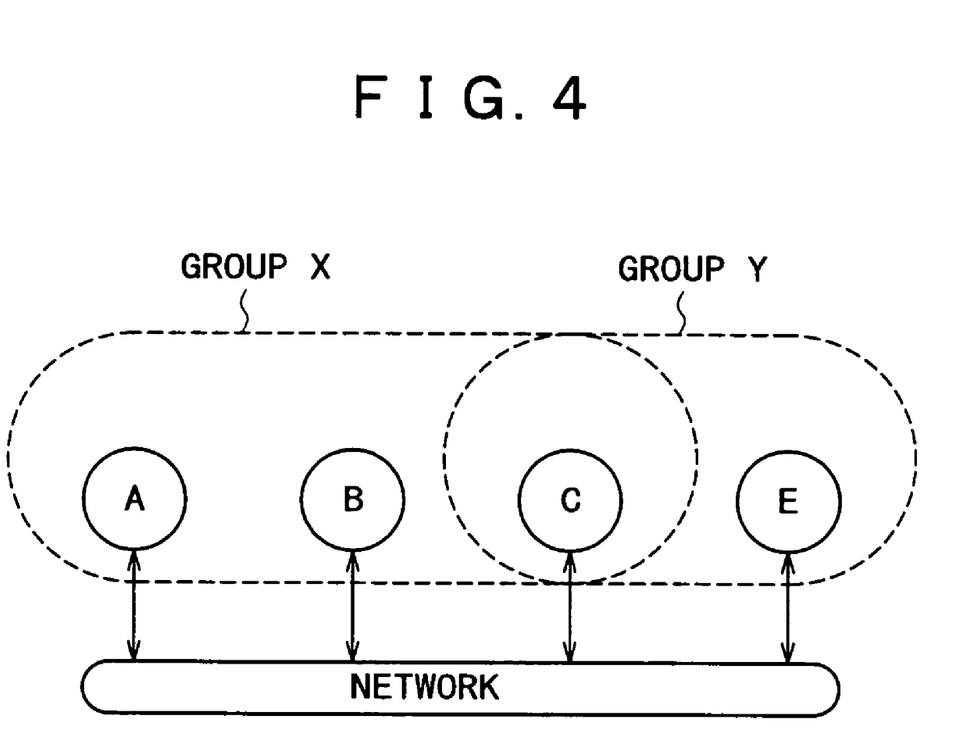
FIG. 4 is another explanatory view outlining functions of user terminals to which this invention is applied.

There exist conventional techniques such as SSL (secure sockets layer) for preventing interception, tampering or falsification of communicated data. SSL is an encrypted communication technique adopted as standard in the field of communications between a single source and a single destination (i.e., between a browser and a Web server). Illustratively, as shown in FIG. 1, SSL may be adopted for data communications between members A, B, C and D making up a group. In this example, an encryption key $K_{AB}$ is used for communication between the members A and B, an encryption key $K_{AC}$ between the members A and C, and an encryption key $K_{BC}$ between the members B and C. When communications within the group composed of "n" members are considered, the necessary number of encryption keys equals the combinations of the "n" members involved. In the case of FIG. 4 where there are four members (n=4), six encryption keys ($_4C_2$) are needed.

Figure 2:
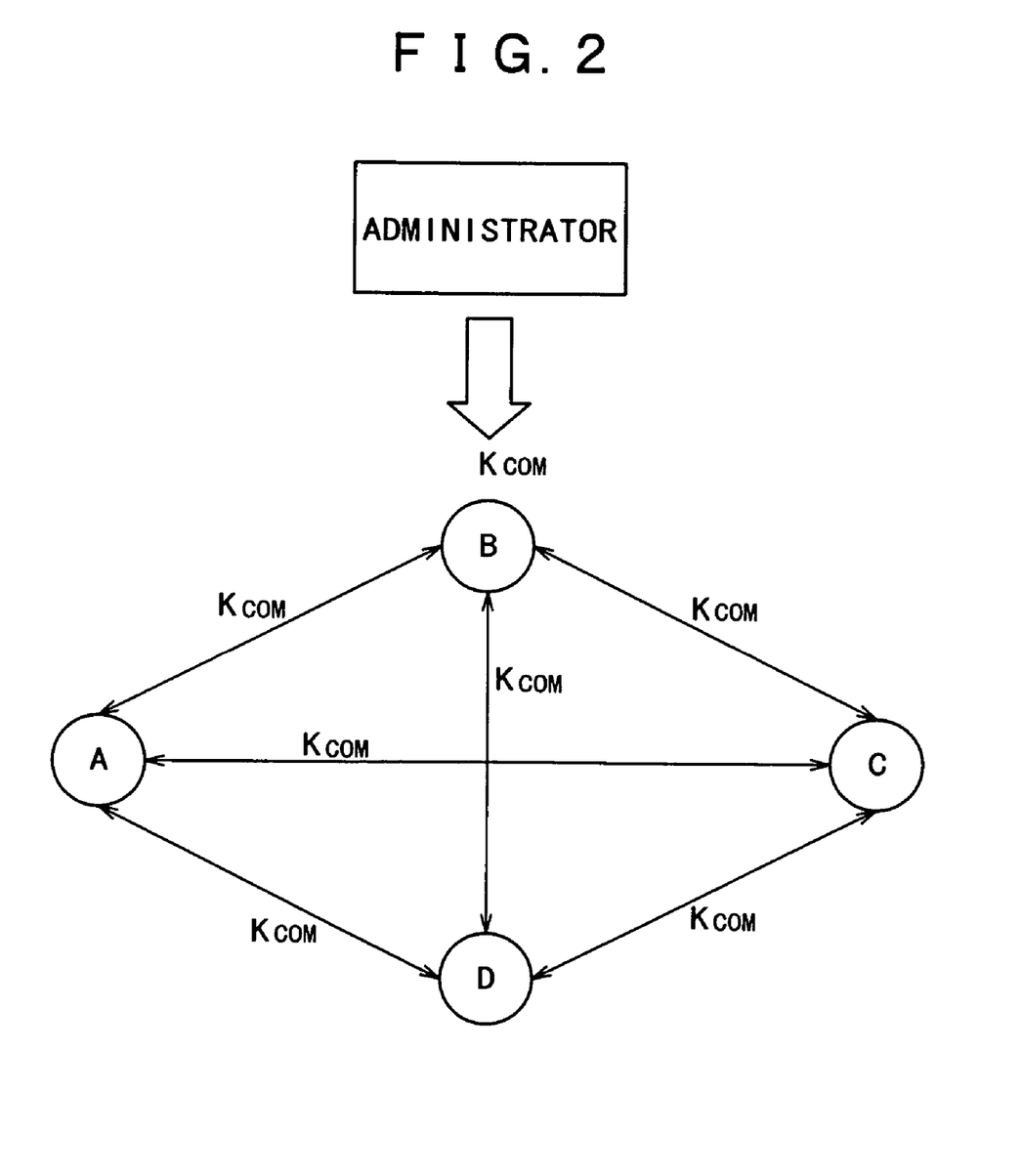
FIG. 2 is an explanatory view illustrating a conventional encrypted communication setup without recourse to SSL.

As opposed to the techniques such as SSL above requiring a large number of encryption keys, there have been proposed methods, as shown in FIG. 2, which allow a group administrator or the like to supply a common encryption key $K_{COM}$ only to the members belonging to a given group and not to any nonmembers. One such method is disclosed illustratively in Japanese Patent Laid-Open No. 2003-143121 (called the cited method hereunder).

The cited method is capable of letting a server broadcast data only to the members of a given group while preventing nonmembers from intercepting, tampering with or falsifying the transmitted data. The act of interception, in this context, means not only acquiring transmitted data but also decoding the obtained data for use as effective information.

However, the cited method is incapable of preventing an unscrupulous member within the group from committing unscrupulous acts against other members of the group (e.g., where the member A sends illicitly prepared data to other members; where data sent by the member A to the member B is intercepted, tampered with or falsified by the member C).

SUMMARY OF THE INVENTION

The present invention has been made in view of the above circumstances and provides a data communicating apparatus, data communicating method and a program for preventing both members of a given group and nonmembers from intercepting, tampering with or falsifying data communicated between the members without recourse to a plurality of encryption keys.

According to an aspect of the present invention, there is provided a data communicating apparatus for communicating data over a network with members of a group to which the apparatus belongs as another member, the apparatus including:

generating unit for generating validity verification data for validating the apparatus;

reporting unit for reporting the validity verification data generated by the generating unit to a management device for managing the group;

holding unit which, if the apparatus is validated by the management device based on the validity verification data, then holds a group-shared key supplied by the management device solely to the members of the group, in correspondence with group identification information for identifying the group and self-identification information for identifying the apparatus;

receiving unit for receiving encrypted data furnished with the group identification information over the network;

decrypting unit for decrypting the encrypted data received by the receiving unit by use of the group-shared key corresponding to the group identification information attached to the encrypted data;

verifying unit for verifying results of the decryption performed by the decrypting unit;

discarding unit for discarding the encrypted data and the results of the decryption in accordance with results of the verification performed by the verifying unit;

checking unit for checking to determine whether information which is included in outgoing data to be transmitted and which indicates a source of transmission matches the self-identification information; and outputting unit for outputting the outgoing data onto the network.

According to another aspect of the present invention, there is provided a data communicating method for communicating data over a network with members of a group to which a user of the method belongs as another member, the method including the steps of:

generating validity verification data for validating the user;

reporting the validity verification data generated in the generating step to a management device for managing the group;

if the user is validated by the management device based on the validity verification data, then holding a group-shared key supplied by the management device solely to the members of the group, in correspondence with group identification information for identifying the group and self-identification information for identifying the user;

receiving encrypted data furnished with the group identification information over the network;

decrypting the encrypted data received in the receiving step by use of the group-shared key corresponding to the group identification information attached to the encrypted data;

verifying results of the decryption performed in the decrypting step;

discarding the encrypted data and the results of the decryption in accordance with results of the verification performed in the verifying step;

checking to determine whether information which is included in outgoing data to be transmitted and which indicates a source of transmission matches the self-identification information; and outputting the outgoing data onto the network.

According to still another aspect of the present invention, there is provided a program for communicating data over a network with members of a group to which a user of the program belongs as another member, the program causing a computer to carry out the steps of:

generating validity verification data for validating the user;

reporting the validity verification data generated in the generating step to a management device for managing the group;

if the user is validated by the management device based on the validity verification data, then holding a group-shared key supplied by the management device solely to the members of the group, in correspondence with group identification information for identifying the group and self-identification information for identifying the user;

receiving encrypted data furnished with the group identification information over the network;

decrypting the encrypted data received in the receiving step by use of the group-shared key corresponding to the group identification information attached to the encrypted data;

verifying results of the decryption performed in the decrypting step;

discarding the encrypted data and the results of the decryption in accordance with results of the verification performed in the verifying step;

checking to determine whether information which is included in outgoing data to be transmitted and which indicates a source of transmission matches the self-identification information; and outputting the outgoing data onto the network.

According to the invention, as outlined above, it is possible to prevent both members of a given group and nonmembers from intercepting, tampering with or falsifying data communicated between the members without recourse to a plurality of encryption keys.

Other objects, features and advantages of the invention will become more apparent upon a reading of the following description and appended drawings.

DETAILED DESCRIPTION OF THE PREFERRED EMBODIMENTS

What is described below as the preferred embodiments of this invention corresponds to the appended claims as follows: the description of the preferred embodiments basically provides specific examples supporting what is claimed. If any example of the invention described below as a preferred embodiment does not have an exactly corresponding claim, this does not mean that the example in question has no relevance to the claims. Conversely, if any example of the invention described hereunder has a specifically corresponding claim, this does not mean that the example in question is limited to that claim or has no relevance to other claims.

Furthermore, the description below of the preferred embodiments does not claim to include all examples corresponding to the whole claims. In other words, the description hereunder does not limit or deny any inventive entities which are not covered by the appended claims of this invention but which may be added or brought about by this applicant in the future by divisional application or by amendment.

A data communicating apparatus of this invention (e.g., user terminal 3 in FIG. 7), as claimed in one of the appended claims, includes: a generating unit (e.g., TPM 24 in FIG. 7 performing step S11 in FIG. 11) for generating validity verification data (e.g., validity verification data 61 in FIG. 12) for validating the apparatus; a reporting unit (e.g., communication interface 27 in FIG. 7 performing step S12 in FIG. 11) for reporting the validity verification data generated by the generating unit to a management device for managing the group (e.g., group management device 5 in FIG. 6); a holding unit (e.g., ID/key table management unit 28 in FIG. 7 performing step S14 in FIG. 11) which, if the apparatus is validated by the management device based on the validity verification data, then holds a group-shared key supplied by the management device solely to the members of the group, in correspondence with group identification information for identifying the group and self-identification information for identifying the apparatus; a receiving unit (e.g., communication interface 27 in FIG. 7 performing step S31 in FIG. 15) for receiving encrypted data furnished with the group identification information over a network (e.g., network 2 in FIG. 6); a decrypting unit (e.g., encryption unit 29 in FIG. 7 performing step S32 in FIG. 15) for decrypting the encrypted data received by the receiving unit by use of the group-shared key corresponding to the group identification information attached to the encrypted data; a verifying unit (e.g., incoming data determination unit 30 in FIG. 7 performing step S33 in FIG. 15) for verifying results of the decryption performed by the decrypting unit; a discarding unit (e.g., incoming data determination unit 30 in FIG. 7 performing step S38 in FIG. 15) for discarding the encrypted data and the results of the decryption in accordance with results of the verification performed by the verifying unit; a checking unit (e.g., outgoing data determination unit 31 in FIG. 7 performing step S22 in FIG. 14) for checking to determine whether information which is included in outgoing data to be transmitted and which indicates a source of transmission matches the self-identification information; and an outputting unit (e.g., communication interface 27 in FIG. 7 performing step S24 in FIG. 14) for outputting the outgoing data onto the network.

The data communicating apparatus outlined above may further include a transferring unit (e.g., communication interface 27 in FIG. 7 performing step S37 in FIG. 15) for transferring the encrypted data received by the receiving unit in accordance with the results of the verification performed by the verifying unit.

A data communicating method of this invention, as claimed in another one of the appended claims, includes the steps of: generating (e.g., in step S11 of FIG. 11) validity verification data for validating the user; reporting (e.g., in step S12 of FIG. 11) the validity verification data generated in the generating step to a management device for managing the group; if the user is validated by the management device based on the validity verification data, then holding (e.g., in step S14 of FIG. 11) a group-shared key supplied by the management device solely to the members of the group, in correspondence with group identification information for identifying the group and self-identification information for identifying the user; receiving (e.g., in step S31 of FIG. 15) encrypted data furnished with the group identification information over the network; decrypting (e.g., in step S32 of FIG. 15) the encrypted data received in the receiving step by use of the group-shared key corresponding to the group identification information attached to the encrypted data; verifying (e.g., in step S33 of FIG. 15) results of the decryption performed in the decrypting step; discarding (e.g., in step S38 of FIG. 15) the encrypted data and the results of the decryption in accordance with results of the verification performed in the verifying step; checking (in step S22 of FIG. 14) to determine whether information which is included in outgoing data to be transmitted and which indicates a source of transmission matches the self-identification information; and outputting (e.g., in step S24 of FIG. 14) the outgoing data onto the network.

A program of this invention, as claimed in yet another one of the appended claims, is the same in specific steps as the above-outlined data communicating method of this invention and thus will not be described further.

Figure 3:
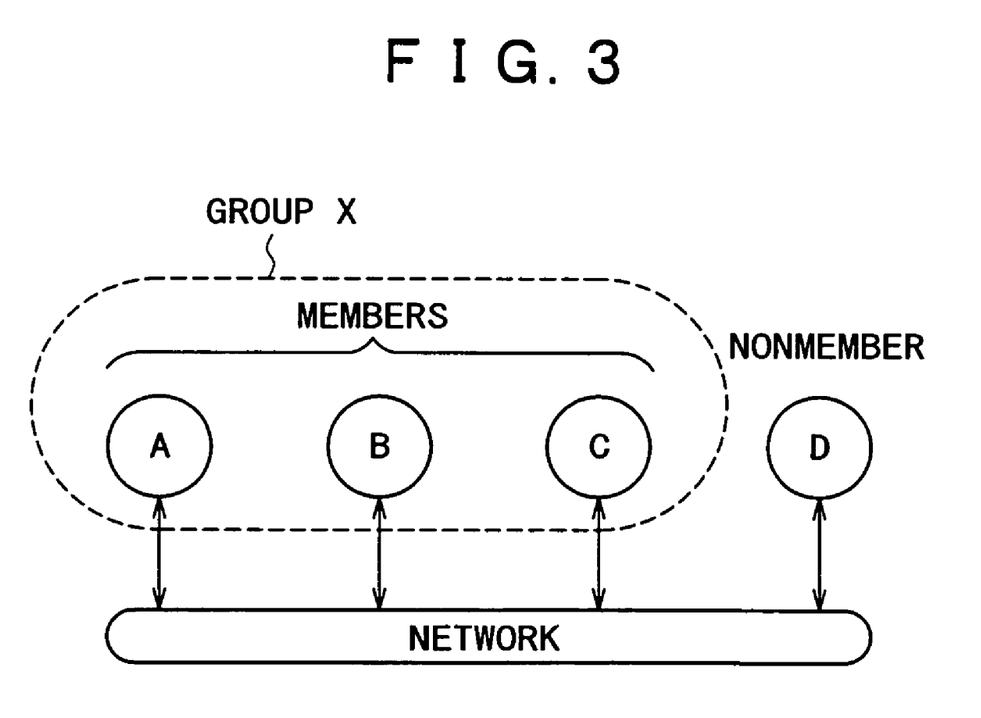
FIG. 3 is an explanatory view outlining functions of user terminals to which this invention is applied.

The functions of the user terminal to which this invention is applied are outlined below. Suppose that user terminals A, B, C, D, E and F according to the invention are connected to a network and that the terminals A, B and C belong to a group X as shown in FIG. 3. In that setup, the user terminals A, B and C are assumed to hold a group-shared key common to the group X. Within the group X, its members can communicate data on a one-to-one or a one-to-many basis. The setup prevents the user terminal D which is a nonmember and any member belonging to the group X but not relevant to communications of interest (e.g., user terminal C irrelevant to the communication between the terminals A and B) from intercepting, tampering with or falsifying the data to be communicated.

Some user terminals such as the user terminal C in FIG. 4 may belong to a plurality of groups. The user terminal C holds the group-shared key of the group X and a group-shared key of a group Y.

Figure 5:
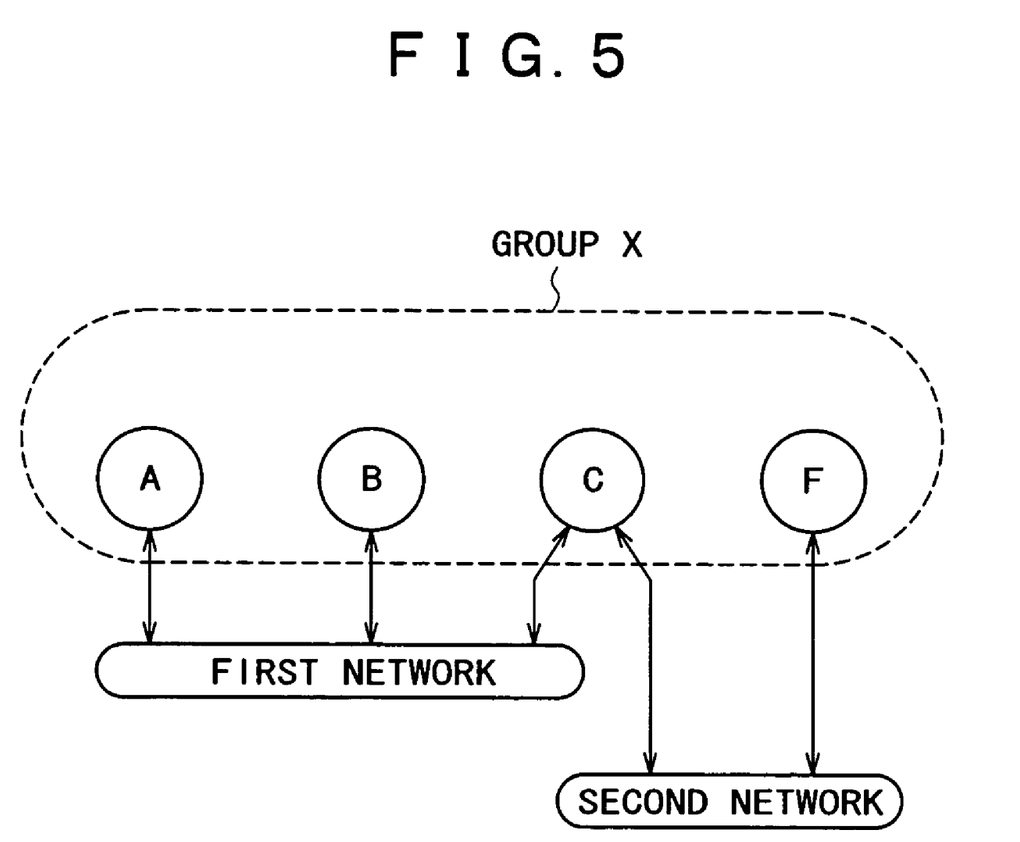
FIG. 5 is still another explanatory view outlining functions of user terminals to which this invention is applied.

A group may be composed of a mixture of user terminals connected to different networks. Illustratively, as shown in FIG. 5, the group X may be constituted by the user terminals A and B connected to a first network, by the user terminal C connected to both the first and a second network, and by the user terminal F connected to the second network. To set up this group requires the presence of the user terminal C connected to both the first and the second networks. The user terminal C works to relay data communications between the first and the second networks. Illustratively, the first network may be a WAN (wide area network) such as the Internet, and the second network may be a dedicated cellular phone communication network.

Figure 6:
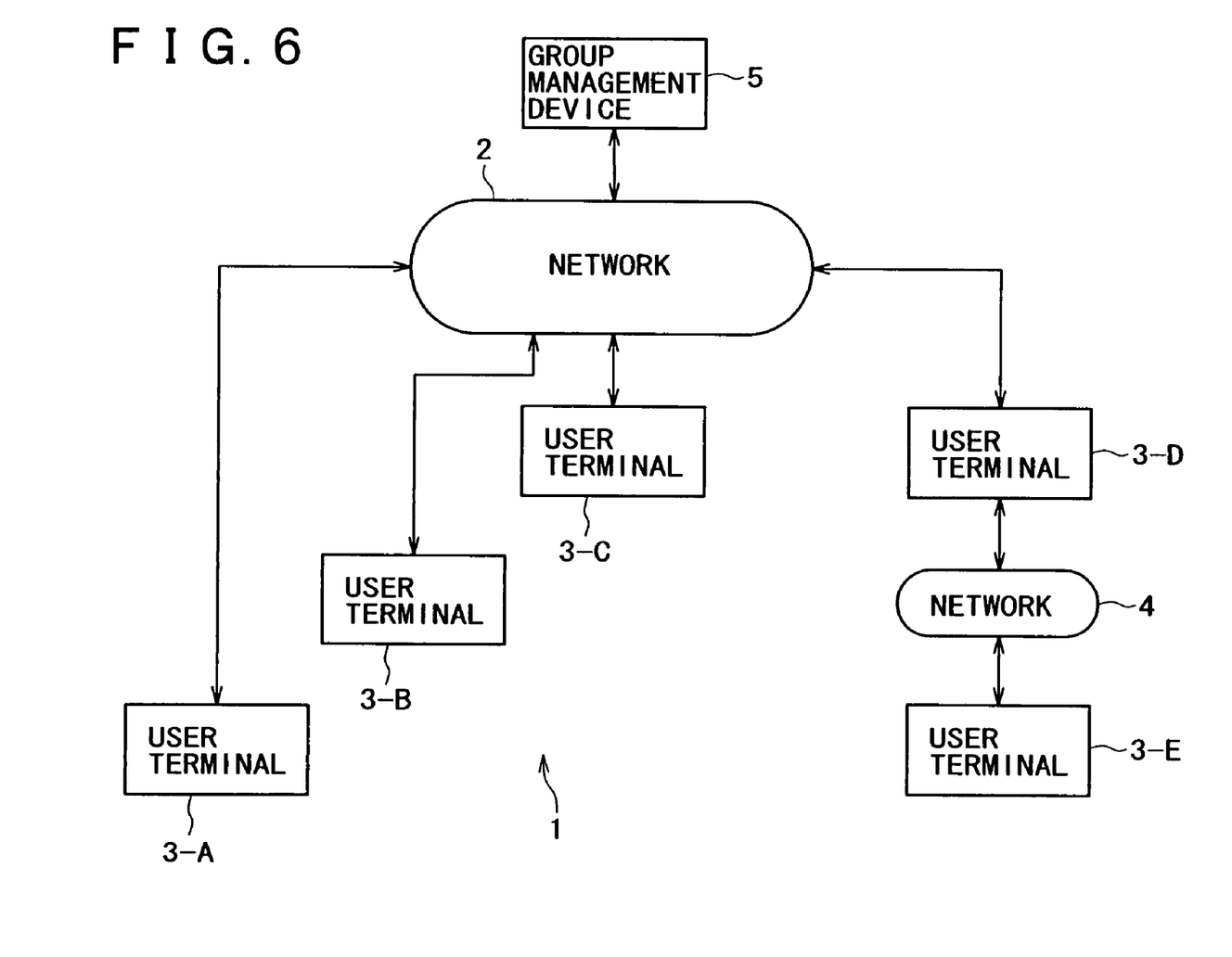
FIG. 6 is a schematic view showing a typical configuration of a communication system including the user terminals to which this invention is applied.

FIG. 6 schematically shows a typical configuration of a communication system 1 including user terminals to which this invention is applied. The communication system 1 is constituted by user terminals 3-A, 3-B, 3-C, 3-D, and a group management device 5 connected to a network 2, and by a user terminal 3-E connected to a network 4. The user terminal 3-D is connected to both the network 2 and the network 4.

Illustratively, the network 2 may be a WAN such as the Internet. The user terminals 3-A through 3-E may be video game machines for network-based games, exchanging diverse kinds of data over the networks 2 and 4. In the description that follows, the user terminals 3-A through 3-E will be generically referred to as the user terminal 3 if there is no specific need for distinction therebetween.

The network 4, established independently of the network 2, may be a LAN (local area network), a dedicated cellular phone communication network, or some other suitable network.

The group management device 5 determines whether each user terminal 3 is a valid terminal desisting from any illicit act. When the user terminal 3 is found valid, the group management device 5 supplies that terminal with a group-shared key of the group to which the terminal in question belongs and a list of members making up the group.

Figure 7:
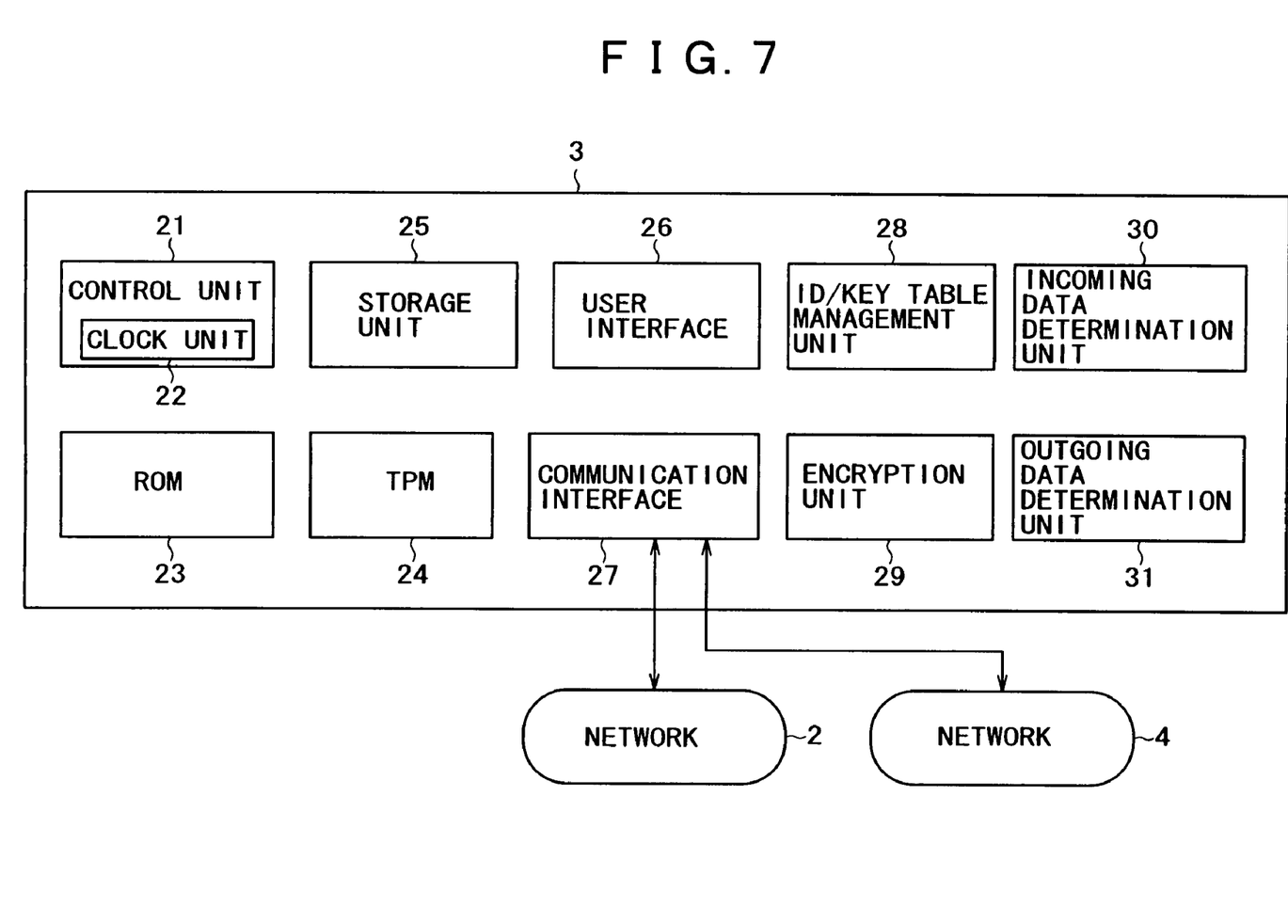
FIG. 7 is a block diagram indicating a typical structure of a user terminal included in the system of FIG. 6.

FIG. 7 indicates a typical structure of the user terminal 3. A control unit 21 is composed illustratively of a CPU (central processing unit). By carrying out relevant programs, the control unit 21 controls the user terminal 3 as a whole so that the latter functions as a video game machine exchanging data and messages with other user terminals 3. A clock unit 22 incorporated in the control unit 21 keeps time. A ROM (read only memory) 23 retains the programs to be executed by the control unit 21.

Figure 8:
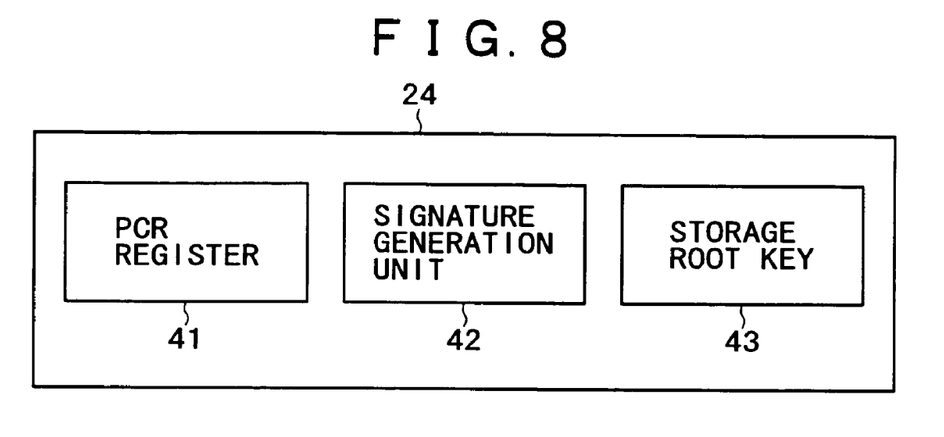
FIG. 8 is a block diagram depicting a typical structure of a TPM (trusted platform module) included in the structure of FIG. 7.

A TPM (trusted platform module) 24 is subject to specifications stipulated by TCG (Trusted Computing Group). As such, the TPM 24 generates validity verification data used to verify the validity of the user terminal 3. As shown in FIG. 8, the TPM includes a PCR register 41, a signature generation unit 42, and a storage root key 43.

The PCR register 41 is a register to which a predetermined value (hash value) is added every time a program is started on the user terminal 3. The value held in this register is used to certify the integrity of the activated program. The signature generation unit 42 holds an attestation identity key (secret key) unique to the user terminal 3 and, using that key, generates an electronic signature. The signature generation unit 42 also retains an attestation identity public key certificate specific to the user terminal 3. The storage root key 43 is used to encrypt data about the TPM 24 and write the encrypted data to a storage unit 25 that is less tamper-resistant than the TPM 24. The storage root key 43 is also used to read the encrypted data from the storage unit 25 and decrypt the retrieved data.

The storage unit 25 is illustratively made up of a hard disk drive that stores programs, data encrypted by use of the storage root key 43, and other resources. A user interface 26 admits the input of operations from the user and causes screens to appear reflecting the results of processing.

A communication interface 27 communicates data with other user terminals 3 over the network 2 or 4.

Figure 9:
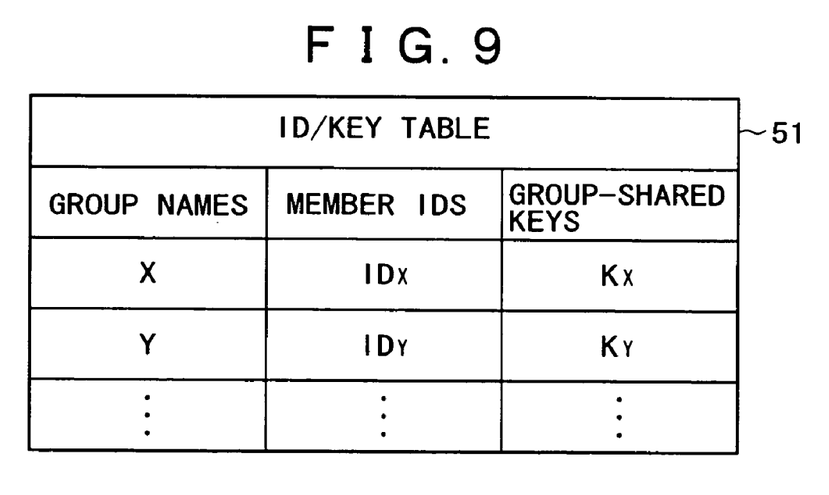
FIG. 9 is a tabular view of an ID/key table managed by an ID/key table management unit in the structure of FIG. 7.

An ID/key table management unit 28 manages an ID/key table 51, shown in FIG. 9, which associates information (e.g., group name) for identifying a given group or groups to which the user of this user terminal 3 belongs, with a member ID for identifying the user terminal 3 in the group and a group-shared key of the group in question. The group names, member IDs and group-shared keys are all supplied by the group management device 5.

Illustratively, the ID/key table 51 in FIG. 9 indicates that this user terminal 3 belongs to a group X, that the member ID of the user terminal 3 in the group X is $ID_X$, and that the group-shared key of the group X is $K_X$. The table 51 also shows that the user terminal 3 belongs to a group Y as well, that the member ID of the user terminal 3 in the group Y is $ID_Y$, and that the group-shared key of the group Y is $K_Y$.

The ID/key table management unit 28 holds a member ID list that lists the member IDs of all members belonging to the groups of which this user terminal 3 is another member. The member ID list is also supplied by the group management unit 5.

An encryption unit 29 decrypts, using a group-shared key, encrypted data that has been received by the communication interface 27, and outputs the decrypted data to an incoming data determination unit 30. The encryption unit 29 encrypts outgoing data to be transmitted which has been validated by an outgoing data determination unit 31, and outputs the encrypted data to the communication interface 27.

The incoming data determination unit 30 reads a destination ID or IDs from the incoming data decrypted by the encryption unit 29, and compares what is retrieved with the member ID of this user terminal 3 to determine whether the user terminal 3 is a valid destination for the incoming data. If the user terminal 3 is found to be a valid destination, the incoming data is fed to the currently executing program such as a video game program.

The outgoing data determination unit 31 reads a source ID from outgoing data to be transmitted which is generated by the currently executing program (e.g., video game), and compares what is retrieved with the member ID granted to the user of this user terminal 3 in order to determine whether the user has declared the correct ID. If the member ID is found valid, the outgoing data determination unit 31 outputs the outgoing data to the communication interface 27.

The ID/key table management unit 28, encryption unit 29, incoming data determination unit 30, and outgoing data determination unit 31 may be either constituted by hardware or implemented by software programs which operate as function blocks when executed by the control unit 21.

Figure 10:
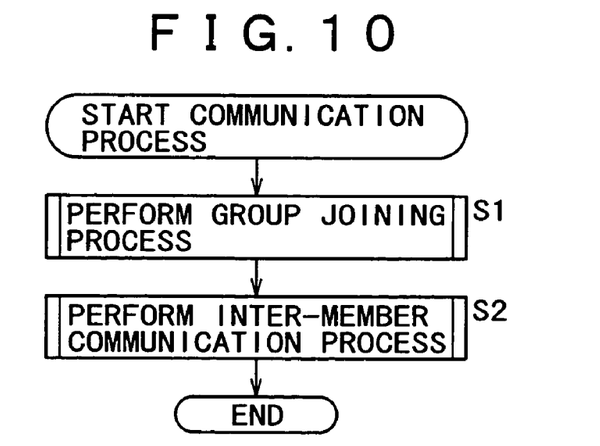
FIG. 10 is a flowchart of steps constituting a communication process performed by a user terminal.

Described below with reference to the flowchart of FIG. 10 is a process in which a nonmember user joins the group X to become a group member and communicates data generated illustratively by a video game program with other members of the same group (the process is called the data communication process hereunder).

Figure 11:
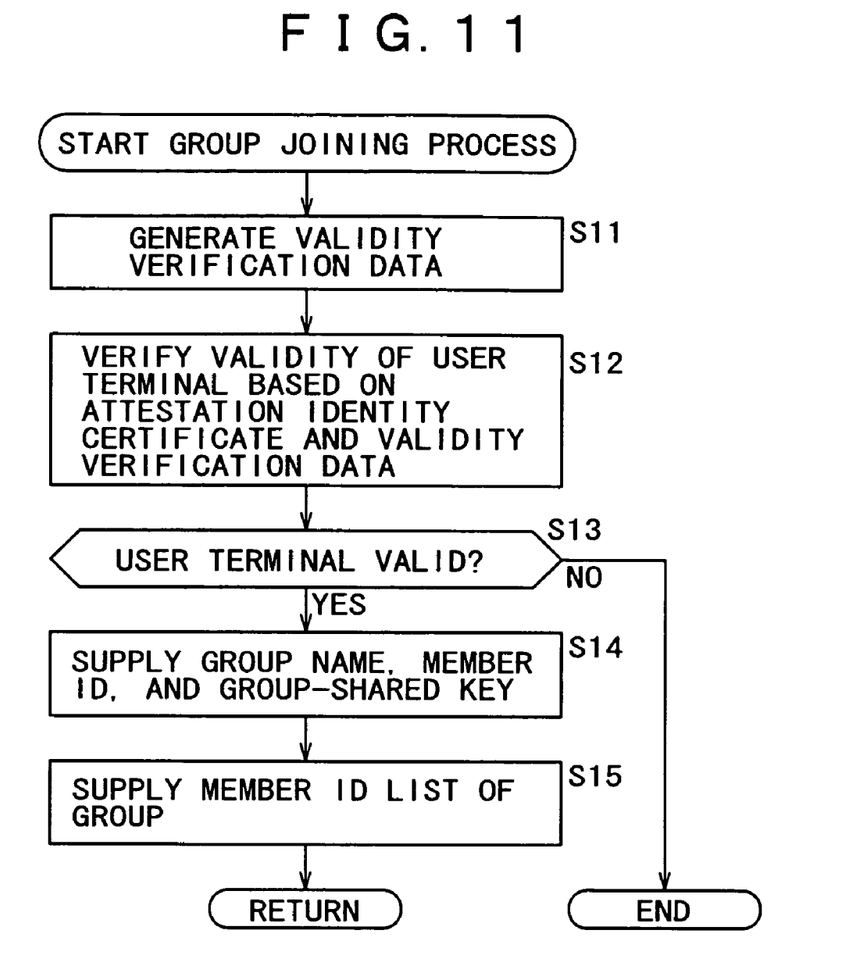
FIG. 11 is flowchart of detailed steps constituting the group joining process of step S1 in FIG. 10.
Figure 12:
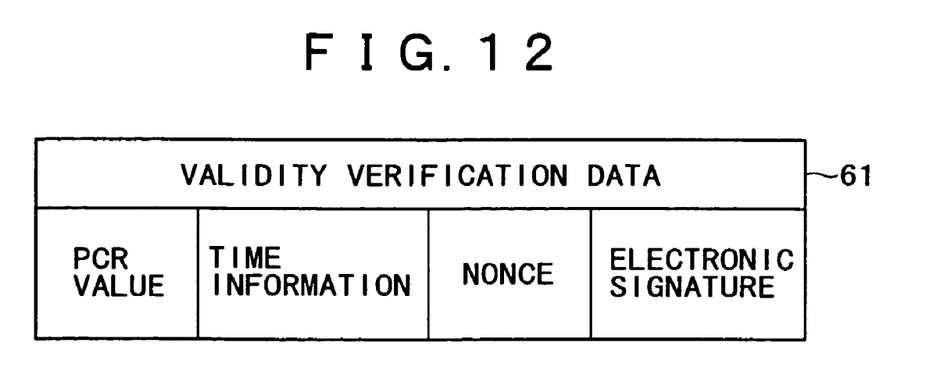
FIG. 12 is a schematic view showing typical validity verification data generated in step S11 of FIG. 11.

In step S1, a nonmember such as the user terminal 3-D shown in FIG. 3 carries out a group joining process to join the group X. The group joining process is described below by referring to the flowchart of FIG. 11. In step S11, the TPM 24 of the user terminal 3-D generates validity verification data made up of a PCR value, time information, nonce, and an electronic signature as depicted in FIG. 12. More specifically, when a plurality of programs constituting, say, a video game are started, hash values are calculated by the TPM on the pre-loaded programs and added successively to the PCR register 41 to form the PCR value. The time information is provided as time-of-day data acquired from the clock unit 22. Nonce refers to a random number supplied by the group management device 5 when the process of step S11 has started. These pieces of information are connected by the TPM 24, and supplemented with the electronic signature generated by the signature generation unit 42 applying its attestation identity key to the connected data. This is how the validity verification data is generated. The PCR value is supposed to coincide with a predetermined value held by the group management unit 5 only when the activated multiple programs are all valid.

In step S12, the TPM 24 outputs the valid verification data it has generated together with the attestation identity public key certificate it has retained to the communication interface 27. In turn, the communication interface 27 transmits the validity verification data and attestation identity public key certificate coming from the TPM 24 to the group management device 5 via the network 2. Based on the validity verification data and attestation identity public key certificate it received, the group management device 5 verifies the validity of the user terminal 3-D. Specifically, the group management device 5 ascertains the following four points:

that the attestation identity public key certificate is valid;

that the electronic signature contained in the validity verification data is valid;

that the PCR value included in the validity verification data matches a predetermined value; and that the difference between the time of day indicated by the time information as part of the validity verification data on the one hand and the time at which the validity verification data was received on the other hand is less than a predetermined threshold value.

In step S13, the group management device 5 determines whether the user terminal 3-D is a valid terminal based on the outcome of the verification in step S12. The user terminal 3-D is found to be valid only if all of the above four requirements are met. When the user terminal 3-D is validated in step S13, step S14 is reached.

In step S14, the group management device 5 supplies the user terminal 3-D with the group name X, the member ID of the user terminal 3-D in the group X, and the group-shared key $K_X$ of the group X. The ID/key table management unit 28 of the user terminal 3-D writes the supplied group name, member ID, and group-shared key $K_X$ to the ID/key table 51 managed by the unit 28.

In step S15, the group management device 5 supplies the user terminal 3-D with a member ID list showing the members belonging to the group X. The ID/key table management unit 28 of the user terminal 3-D writes the supplied member ID list to the ID/key table 51 managed by the unit 28.

This completes the processing of FIG. 11 whereby the user terminal 3-D is allowed to join the group X as a member. After this, the user terminal 3-D can communicate data with other members of the group X.

If in step S13 the user terminal 3-D is not found valid, then the group joining process is brought to an end, and steps S14 and S15 are left unexecuted. At this point, the communication process of the user terminal 3-D is terminated halfway.

Returning to FIG. 10, the user terminal 3-D in step S2 starts a process for communicating data with other members (e.g., user terminal 3-A) of the group X (the process is called the inter-member communication process hereunder).

Figure 13A:
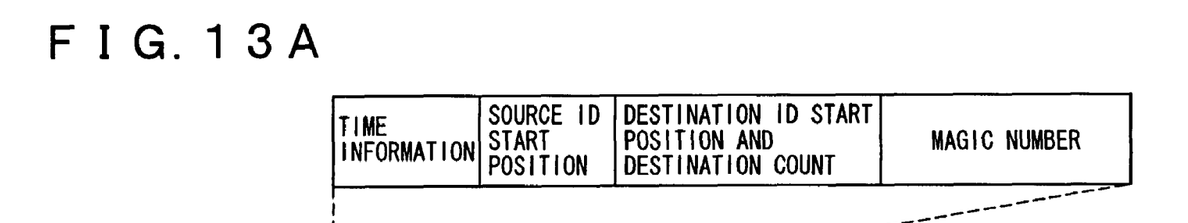
FIGS. 13A, 13B and 13C are schematic views indicating a typical structure of data to be communicated.

A typical structure of data to be communicated in the inter-member communication process is explained below with reference to FIGS. 13A, 13B and 13C. As shown in FIG. 13A, a header of the data to be communicated is constituted by time information indicating the time at which this header was generated, by a source ID start position denoting the initial position of the ID identifying the source from which a data sequence is to be transmitted, by a destination ID start position and a destination count regarding the data sequence to be sent, and by a predetermined magic number.

Figures 13B, 13C:
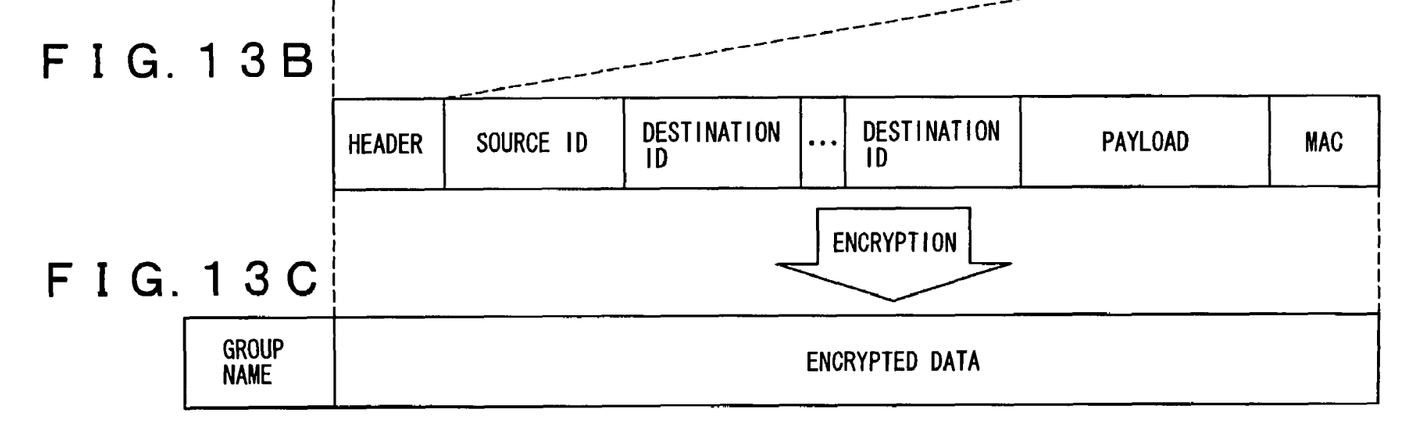

The header is followed, as depicted in FIG. 13B, by a source ID identifying the member who originates the data to be sent, a destination ID or IDs designating the member or members as the destinations of the data, and a payload constituting the actual information to be transmitted. Alternatively, the destination ID may be omitted in order to specify that all members of the group be the destinations of the data.

The payload is followed by a message authentication code (MAC) regarding the header, source ID, destination ID or IDs, and payload. Either the magic number or the MAC may be omitted from the header.

As indicated in FIG. 13C, the header, source ID, destination ID or IDs, payload, and MAC are encrypted. Before being sent out, the encrypted data is supplemented with a group name for specifying the group within which the data is communicated.

Figure 14:
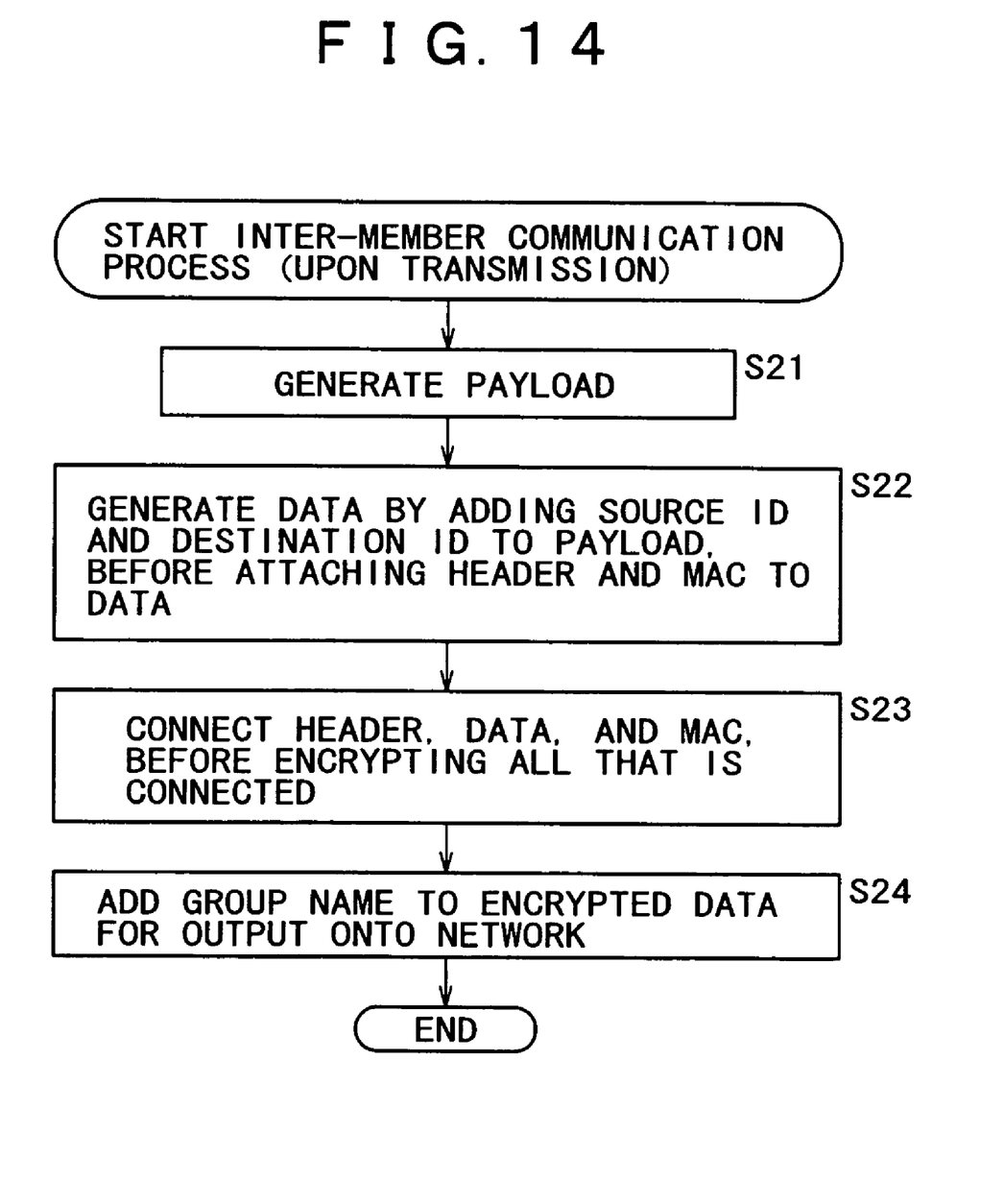
FIG. 14 is a flowchart of steps constituting a transmission process.

Described below with reference to the flowchart of FIG. 14 are typical steps to be carried out to transmit data during the inter-member communication process.

In step S21, the currently executing program of, say, a video game on the user terminal 3-D creates a payload to be transmitted to another member (e.g., user terminal 3-A) of the group X. In step S22, the video game program creates outgoing data by prefixing the payload with the member ID of the user terminal 3-D as the source ID and with the member ID of the user terminal 3-A as the destination ID. The program then generates a header for the data and an MAC regarding the header and data. The program further connects the header, data, and MAC if necessary into a sequence, before outputting the connected data sequence to the outgoing data determination unit 31.

The outgoing data determination unit 31 checks that the member ID of the user terminal 3-D is designated as the source ID in the data, before forwarding the connected sequence of the data, header, and MAC to the encryption unit 29. If the member ID of the user terminal 3-D is not found as the source ID in the data, the process is terminated at this point.

In step S23, the encryption unit 29 encrypts the connected sequence of the header, data, and MAC using the group-shared key $K_X$ of the group X to generate encrypted data. In step S24, the encryption unit 29 attaches the group name X of the group X to the encrypted data before outputting the whole data to the communication interface 27. In turn, the communication interface 27 outputs the encrypted data along with the group name X onto the network 2. The encrypted data placed onto the network 2 is received by the destination user terminal 3-A, etc., belonging to the group X. This is how data transmission takes place in the inter-member communication process.

Figure 15:
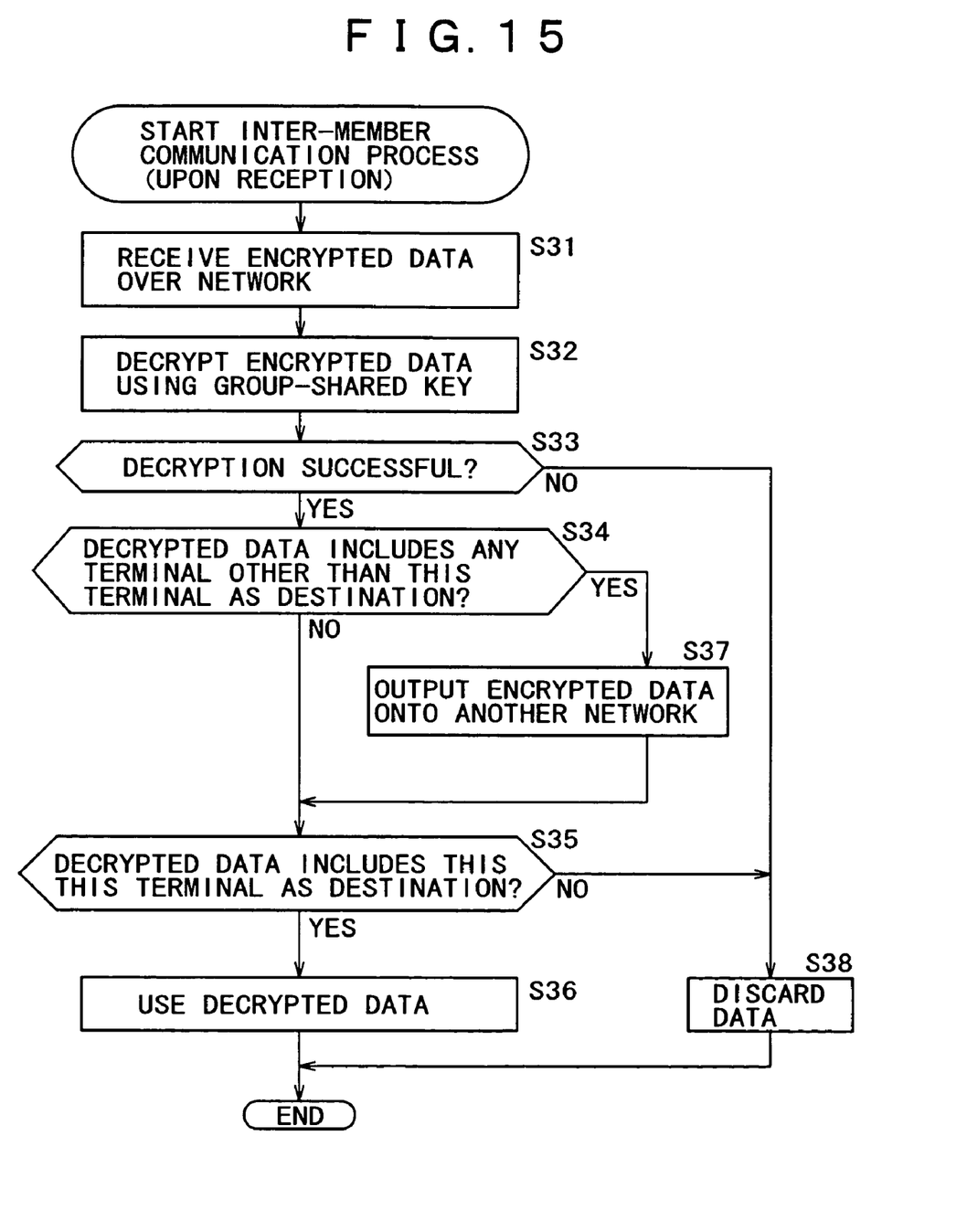
FIG. 15 is a flowchart of steps constituting a reception process.

Described below with reference to the flowchart of FIG. 15 are typical steps to be carried out by the user terminal 3-C to receive data during the inter-member communication process.

In step S31, the communication interface 27 of the user terminal 3-C receives encrypted data prefixed with the group name X. The communication interface 27 forwards the received encrypted data furnished with the group name X to the encryption unit 29. In step S32, the encryption unit 29 acquires the group-shared key $K_X$ of the group X from the ID/key table management unit 28, decrypts the encrypted data using the acquired key, and outputs the decrypted header, data, and MAC to the incoming data determination unit 30.

In step S33, the incoming data determination unit 30 determines whether the data has been correctly decrypted by verifying that the magic number included in the header is valid. The verification may be carried out using an attached MAC instead of the magic number. The verification may optionally be reinforced by a check on whether the difference between the time of day indicated by the time information in the header and the time at which the data was received is less than a predetermined threshold value. When the data is found to have been decrypted correctly, step S34 is reached.

In step S34, the incoming data determination unit 30 determines whether the destination ID or IDs contained in the decrypted data include the member ID other than this terminal (i.e., user terminal 3-C in the group X). If the member ID other than this user terminal is not found included as a destination ID, step S35 is reached.

In step S35, the incoming data determination unit 30 determines whether the destination ID or IDs contained in the decrypted data include the member ID of this terminal. If the member ID of this user terminal is found included as a destination ID, step S36 is reached.

In step S36, the incoming data determination unit 30 supplies the payload of the received data to the video game data program that is supposed to handle the data. The program makes use of the supplied payload as needed. At this point, the source ID and the time information in the header may also be sent to the program in addition to the payload.

If in step S33 the data is not found to have been decrypted correctly, or if the member ID of this user terminal is not found included as a destination ID in step S35, step S38 is reached. In step S38, the incoming data determination unit 30 discards the encrypted data and the failed result of the decryption.

If in step S34 the destination ID or IDs in the decrypted data include a member ID or IDs other than the member ID of this user terminal, then step S37 is reached so that the encrypted data may be output onto the network 4, i.e., a network different from the network 2 over which the encrypted data has been received. In step S37, the encryption unit 29 forwards the encrypted data along with the group name X to the communication interface 27. The communication interface 27 outputs the encrypted data together with the group name X onto the different network 4. The encrypted data placed on the network 4 is received by user terminals 3-F, etc., belonging to the group X. Step S37, when carried out, allows the data of interest to be communicated between members belonging to the same group but not connected to the same network. This is how data reception takes place in the inter-member communication process.

According to the invention, as described, the group management device 5 verifies the validity of the user terminal 3, thereby eliminating the need for the data-transmitting user terminal 3 and the data-receiving user terminal 3 to authenticate each other before the communication. After validating the user terminal 3, the group management device 5 has no need to perform such steps as repeating the data to be communicated between a plurality of user terminals 3.

Between a plurality of user terminals 3 belonging to the same group, the inventive scheme prevents both members of the group and nonmembers from intercepting, tampering with or falsifying the data to be communicated by the use of a single group-shared key instead of a plurality of encryption keys.

In this specification, the steps which are stored on a recording medium and which describe the programs to be executed represent not only the processes that are to be carried out in the depicted sequence (i.e., on a time series basis) but also processes that may be performed parallelly or individually.

In this specification, the term "system" refers to an entire configuration made up of a plurality of component devices.

As many apparently different embodiments of this invention may be made without departing from the spirit and scope thereof, it is to be understood that the invention is not limited to the specific embodiments thereof except as defined in the appended claims.

What is claimed is:

1. A data communicating apparatus for communicating data over a network with members of a group to which the apparatus belongs as another member, said apparatus comprising:
   a processor;
   a generating unit configured to generate validity verification data for validating said apparatus;
   a reporting unit configured to report said validity verification data generated by said generating unit to a management device for managing said group;
   a holding unit configured to, when said apparatus is validated by said management device based on said validity verification data, hold a group-shared key supplied by said management device solely to said members of said group, along with group identification information for identifying said group and self-identification information for identifying said apparatus;
   a receiving unit configured to receive encrypted data furnished with said group identification information over said network;
   a decrypting unit configured to decrypt said encrypted data received by said receiving unit by using said group-shared key corresponding to said group identification information attached to said encrypted data;
   a verifying unit configured to verify results of the decryption performed by said decrypting unit and to match said self-identification information for identifying said apparatus with recipient identification information attached to said encrypted data;
   a discarding unit configured to discard said encrypted data and said results of said decryption when the verification of the results of the decryption performed by said verifying unit is negative and when said self-identification information for identifying said apparatus does not match the recipient identification information attached to the encrypted data;
   a checking unit configured to check to determine whether information which is included in outgoing data to be transmitted and which indicates a source of transmission matches said self-identification information; and
   a outputting unit configured to output said outgoing data onto said network.

2. The data communicating apparatus according to claim 1, wherein said verifying unit verifies whether said decrypting unit has successfully decrypted said encrypted data based on a header of the decrypted data derived from said decryption.

3. The data communicating apparatus according to claim 2, wherein said verifying unit verifies whether said decrypting unit has successfully decrypted said encrypted data based on a magic number included in said header of said decrypted data derived from said decryption.

4. The data communicating apparatus according to claim 1, wherein said verifying unit verifies whether said encrypted data is valid based on time stamp information included in a header of the decrypted data derived from said decryption.

5. The data communicating apparatus according to claim 1, wherein said verifying unit verifies whether information which is included in decrypted data derived from said decryption and which indicates destinations of transmission includes said self-identification information.

6. The data communicating apparatus according to claim 1, further comprising:
   transferring unit configured to transfer said encrypted data received by said receiving unit in accordance with said results of said verification performed by said verifying unit.

7. The data communicating apparatus according to claim 1, wherein said checking unit discards said outgoing data to be transmitted if said information which is included in said outgoing data and which indicates the source of transmission is not found to match said self-identification information.

8. A data communicating method for communicating data over a network with members of a group to which a user of the method belongs as another member, implemented in a data communicating apparatus having a processor, said method comprising:
   generating, at the group communications apparatus, validity verification data for validating said user;
   reporting, at the group communications apparatus, said validity verification data to a management device for managing said group;
   holding, at the group communications apparatus, a group-shared key supplied by said management device solely to said members of said group, along with group identification information for identifying said group and self-identification information for identifying said user, when said user is validated by said management device based on said validity verification data;
   receiving, at the group communications apparatus, encrypted data furnished with said group identification information over said network;
   decrypting, at the group communications apparatus, said encrypted data by use of said group-shared key corresponding to said group identification information attached to said encrypted data;
   verifying, at the group communications apparatus, results of the decryption, said verifying further matching said self-identification information for identifying said apparatus with recipient identification information attached to said encrypted data;
   discarding, at the group communications apparatus, said encrypted data and said results of said decryption when the verification of the results of the decryption is negative and when said self-identification information for identifying said apparatus does not match the recipient identification information attached to the encrypted data;
   checking, at the group communications apparatus, to determine whether information which is included in outgoing data to be transmitted and which indicates a source of transmission matches said self-identification information; and
   outputting, at the group communications apparatus, said outgoing data onto said network.

9. A computer-readable storage medium encoded with instructions, which when executed by a group communications apparatus causes the group communications apparatus to implement a method, said method communicates data over a network with members of a group to which a user of said method belongs as another member, said method comprising:
   generating, at the group communications apparatus, validity verification data for validating said user;
   reporting, at the group communications apparatus, said validity verification data to a management device for managing said group;
   holding, at the group communications apparatus, a group-shared key supplied by said management device solely to said members of said group, along with group identification information for identifying said group and self-identification information for in said user, when said user is validated by said management device based on said validity verification data;

receiving, at the group communications apparatus, encrypted data furnished with said group identification information over said network;

decrypting, at the group communications apparatus, said encrypted data by use of said group-shared key corresponding to said group identification information attached to said encrypted data;

verifying, at the group communications apparatus, results of the decryption, said verifying further matching said self-identification information for identifying said apparatus with recipient identification information attached to said encrypted data;

discarding, at the group communications apparatus, said encrypted data and said results of said decryption in accordance with results of the verification of the results of the decryption is negative and when said self-identification information for identifying said apparatus does not match the recipient identification information attached to the encrypted data;

checking, at the group communications apparatus, to determine whether information which is included in outgoing data to be transmitted and which indicates a source of transmission matches said self-identification information; and outputting, at the group communications apparatus, said outgoing data onto said network.

* * * * *